United States Patent Office 3,051,649
Patented Aug. 28, 1962

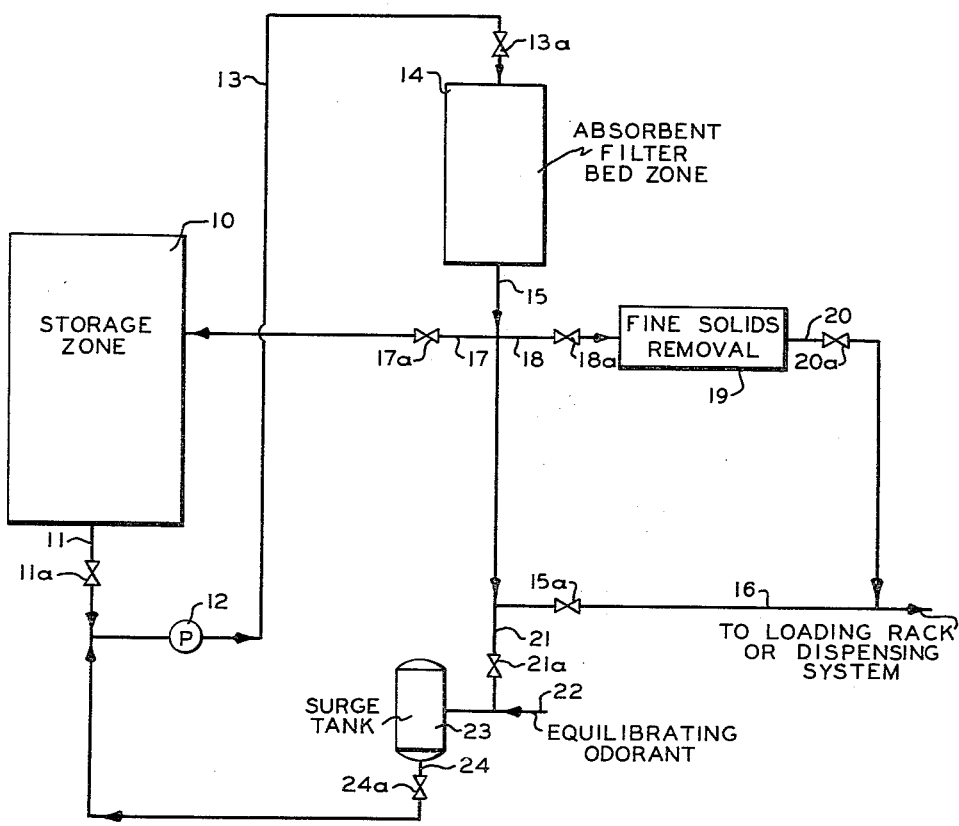

3,051,649
PURIFICATION OF LIQUEFIED PETROLEUM GASES
Theodore W. Legatski, Bartlesville, Okla., assignor to Phillips Petroleum Company, a corporation of Delaware
Filed Oct. 5, 1959, Ser. No. 844,348
9 Claims. (Cl. 208—299)

This invention relates to the purification of liquefied petroleum gases. In accordance with one aspect, this invention relates to the purification of liquefied petroleum gases (LPG) wherein heavy contaminating materials, such as heavy oils, greases, polymers, and the like contained therein, are removed therefrom by contacting said LPG with a solid adsorbent material that selectively absorbs said contaminating materials in the presence of LPG. In accordance with another aspect, this invention relates to a start-up procedure for placing fresh adsorbent beds into service which are utilized for selectively adsorbing contaminating materials from odorized LPG without lowering the odorant concentration of said LPG passed to a place of utilization which comprises cycling a stream of odorized LPG through a new bed of adsorbent until said adsorbent is saturated with odorant, and then placing said bed saturated with odorant into adsorption service for removing contaminants from LPG.

The problem of heavy oils, greases, polymers, and other liquid materials contained in liquefied petroleum gases has been with the industry since its inception. These oils accumulate in containers from which the gas is taken as a vapor, and consequently on reuse will build up to undesirable quantities in these containers. When taken from the containers as a liquid, these heavy contaminating materials pass into the utilization system, and eventually clog regulators, jets, carburetors, and burners, and may accumulate in low points to discharge as slugs of heavy material. In accordance with the present invention, method and apparatus are provided for the removal of these contaminating materials from liquefied petroleum gases prior to final utilization, thus avoiding any such problems during utilization.

LP gases are unique in that they clean up every surface with which they come in contact, all to the detriment of LP gas quality. The heaviest contaminants are lube oils, stop-cock greases, polymers formed from LP gas olefins, etc. One of the problems is to manufacture, store, transport, and handle the product numerous times before it reaches the customer and still keep it free of contaminants. Each step in handling is a potential source of contaminants. As a result, contacting with adsorbent charcoal, etc., has application as a final treatment before passing the LP gas to the customer. Also, subsequent to the purification, clean apparatus should be employed to avoid contamination of the LP gas before it reaches the customer.

In accordance with the present invention, I have found that heavy contaminating materials, such as heavy oils, greases, polymers and the like contained in liquefied petroleum gases can be conveniently removed from said gases by contacting with a solid adsorbent, such as activated charcoal, silica gel, or similar adsorbent, which selectively adsorbs the heavy materials in the presence of LPG. Also, a start-up procedure is provided for placing new beds of adsorbent into service without reducing the odorant concentration of LPG passed to a place of utilization.

It is an object of this invention to purify liquefied petroleum gases. It is another object of this invention to provide a method for the purification of liquefied petroleum gases by removing contaminants contained therein. It is another object of this invention to provide a method for the purification of liquefied petroleum gases for the removal of heavy contaminating materials present therein as the liquefied petroleum gas is taken out of storage for distribution. It is another object of this invention to provide a start-up procedure for fresh adsorbent beds whereby the odorant level of the LPG passed to a place of utilization is maintained at the proper level during the start-up of the operation.

Other aspects, objects, as well as the several advantages of this invention, are apparent from a study of this disclosure, the drawing and the appended claims.

In accordance with the present invention, a method is provided for the removal of heavy contaminating materials, such as heavy oils, greases, polymers, and the like, from liquefied petroleum gases (LPG) which comprises passing the LPG in liquid phase through a bed of activated charcoal, silica gel or similar adsorbent material which selectively adsorbs the heavy contaminating materials in the presence of LPG.

Also, in accordance with the present invention, a method is provided for starting-up or placing fresh adsorbent beds into service utilized for selectively adsorbing heavy contaminating materials from odorized LPG without lowering the odorant concentration of said LPG passed to a place of utilization which comprises cycling a stream of odorized LPG through a new bed of adsorbent material until said adsorbent is saturated with odorant, and then placing said bed of adsorbent saturated with odorant into service for selective adsorption of heavy contaminating materials present in said odorized LPG. The selective adsorbent materials that can be utilized in the practice of the present invention preferably comprise activated charcoal, silica gel, activated alumina, and similar adsorbent materials which selectively adsorb the heavy contaminating materials present in the LPG treated. These adsorbent materials may be activated before use by calcining at temperatures of 500 to 1,500° F. The granular adsorbent materials are used in suitable particle size for permitting fluid flow without excessive pressure drop even in relatively deep beds and at flow rates consistent with efficient adsorption. Ordinarily, the size of the adsorbent particles used in the present invention will be in the range of 4 to 100 mesh U.S. Standard and preferably from 8 to 50 mesh. From the standpoint of adsorption rate, the finer particles are better, but the larger particles are preferable from the standpoint of pressure drop. Thus, the actual size employed becomes a matter of economics.

The temperature of operation of the adsorption zone is ordinarily the ambient temperature of the installation. To provide the greatest adsorptive capacity during adsorption, the temperature is generally kept low, preferably below about 150° F. The operating pressure employed in the adsorption zone is at least sufficient to maintain liquid phase conditions. Pressures above that necessary to maintain liquid phase has no beneficial effect on the process but, of course, can be used if some reason should arise in a specific installation. Liquid flow rates through the adsorption beds will generally range from 0.05 to 5 liquid volumes an hour, preferably 0.1 to 2 volumes per hour.

The conditions of pressure, temperature, etc. employed during regeneration of the adsorbents will depend upon the adsorbent in service. The metal oxide adsorbent, such as silica gel, activated alumina and bauxite, can be regenerated by oxidation of the accumulated heavy contaminating materials on the adsorbent with air or diluted air at 750° F. to 1,200° F. The clean adsorbent is then cooled and used in another cycle. Also, the heavy contaminating materials adsorbed on the adsorbent can be removed by washing off these materials with a volatile and readily adsorbable material, such as benzene, toluene, methyl or ethyl alcohol, and the like, and then removing the adsorbed volatile wash liquid by heating to an elevated temperature, such as 600 to 1,200° F. in a stream of inert gas, the clean adsorbent then being cooled and used in the new adsorption cycle.

Activated charcoal or carbon can be regenerated after use by the above methods also, but the oxidation with air is not desirable due to the oxidation of the carbon adsorbent and rapid loss of this material. Therefore, it is preferable to steam the carbon adsorbent at conventional temperatures, such as 900 to 1,500° F. to remove the adsorbed heavy contaminating materials. The clean carbon is then cooled and reused in the adsorption cycle.

In order that this invention may be more clearly understood, reference will be made to the accompanying drawing which diagrammatically illustrates a flow sheet of one specific embodiment of the present invention.

Referring now to the drawing, a liquefied petroleum gas containing heavy contaminating materials, such as heavy oils, greases, polymers and the like, is stored in storage zone 10. Storage zone 10 can comprise such means, as large refinery tanks, bulk station storage tanks, or underground storage caverns, commonly employed at terminals or other locations requiring large volumes of storage capacity. The liquefied petroleum gas at ambient temperature, which can vary appreciably depending upon whether storage zone 10 is above or below ground, is removed from the storage zone by way of conduit 11 and pressured by pump 12 through conduit 13 and introduced to an upper portion of adsorbent filter bed 14. The contaminated LPG is passed as a liquid through adsorbent bed in filter bed 14 wherein the heavy contaminating materials are selectively adsorbed on the adsorbent which can be activated charcoal, silica gel or other selective adsorbent materials. The purified liquefied petroleum gas is removed from filter bed zone 14 through conduit 15 and is passed by way of conduit 16 to a loading rack or other dispensing system not shown whereby the purified LPG is passed to a place of utilization.

As is well known, adsorbents, such as charcoal and silica gel, have a small content of fine material which is difficult to prevent passing from the bed along with the liquid effluent, particularly immediately following recharging the filter zone with a fresh batch of adsorbent. At such times as difficulty is encountered with fines contaminating the effluent stream, valve 15A may be closed and valves 18A and 20A opened, the liquid effluent thus being carried from line 15 through line 18 to a fine solids removal zone which may be a filter packed with felt, cotton waste or other suitable filtering medium. The filtered material is then removed from zone 19 through line 20 to line 16 to utilization as previously described.

In many installations, the LPG is odorized in storage zone 10, and it is necessary that the odorant be present in the treated gas. Any odorant well known in the art for odorizing LPG can be employed in the present invention. Suitable odorants include the mercaptans, especially methyl and ethyl mercaptan. As charcoal and silica gel are highly selective for the odorants employed in LPG, it is desirable to employ a start-up procedure for freshly charged filter zones wherein the adsorbent is brought to equilibrium prior to passage of the filter zone effluent to utilization through line 16. One method of accomplishing this equilibration is by opening valves 17A, 13A and 11A and closing all other valves in the system. Stored LPG is then pumped through lines 11 and 13 through filter zone 14 and returned to the storage zone through lines 17 until such time as the filter zone effluent contains the proper level of odorant, which indicates that the adsorbent within the filter zone has become saturated. The adsorbent will, of course, hold a small amount of the total odorant content of the LPG and thus must lower the overall content of the material in storage. However, in the ordinary installation, the storage zone will be quite large and the loss of odorant to the adsorbent will be so small as to be immeasurable. In most instances, the above start-up procedure will be quite satisfactory and certainly quite simple.

In some instances, it may be desirable to saturate fresh adsorbent with an added quantity of equilibrating odorant without actually affecting the odorant content of the LPG stored in zone 10. This may be accomplished by opening valves 11A, 13A and 21A and closing all other valves in the system. Pump 12 is then used to pump a small amount of LPG through lines 11 and 13 through adsorbent zone 14 and lines 15 and 21 to surge tank 23. When surge tank 23 has filled to the desired level, valve 11A is closed and valve 24A is opened. Thus, a recirculating stream of LPG is established which continuously passes over the adsorbent in zone 14, and equilibrating odorant may be added to this recirculating stream through line 22. Sufficient odorant is added by this means to satisfy the adsorbent in zone 14 so that the recirculating stream will contain the desired level of odorant. At this time, recirculation may be stopped and the system operated as previously described with passage of LPG to the loading rack or dispensing system.

Although the invention has been described above primarily utilizing only one adsorbent filter bed zone 14, it should be understood by those skilled in the art that any number of beds desired can be advantageously employed. In a specific operation, two adsorbent zones are employed, one being in adsorption service while the other zone is being regenerated and saturated with odorant.

A test of this invention was carried out when difficulty was encountered with heavy residues showing up in LP gas removed from a rented underground storage cavern. The LP gas removed from this cavern was found to contain sufficient heavy contaminants that utilization was causing consumers difficulty. A bed of charcoal was installed at the storage point and the liquid removed from the cavern was passed over the charcoal adsorbent prior to distribution.

After the installation of the charcoal bed, no further difficulty with these heavy residues was encountered.

Reasonable variation and modification are possible within the scope of the foregoing disclosure, drawing and the appended claims to the invention, the essence of which is that heavy contaminating materials, such as heavy oils, greases, polymers and the like, contained in liquefied petroleum gases are selectively removed therefrom by contacting said LPG in the liquid phase with a solid adsorbent that selectively adsorbs said contaminating materials in the presence of LPG and, further, a start-up procedure is provided for placing fresh adsorbent beds into service which are utilized for selectively adsorbing contaminants from odorized LPG without lowering the odorant concentration of said LPG passed to a place of utilization which comprises cycling a stream of odorized LPG through a new bed of adsorbent until said adsorbent is saturated with odorant, and then placing said bed saturated with odorant into selective adsorption service.

I claim:

1. A method for purifying an odorized liquefied petroleum gas containing heavy contaminating materials comprising heavy oils, greases, polymers and the like, before passing said liquefied gas to a place of utilization which comprises removing said odorized liquefied gas from storage, passing same to an adsorption zone containing a fixed bed of a solid adsorbent material, passing said liquefied gas in the liquid phase through said bed to selectively remove said contaminating materials therefrom and to obtain said liquefied gas substantially free of said contaminating materials, passing said purified liquefied gas through a fine solids filtration zone to remove entrained fine adsorbent entrained therein, and passing said liquefied gas to said place of utilization as a product of the method.

2. A method according to claim 1 wherein a fresh bed of adsorbent before being placed into service for adsorption of said contaminating materials from said liquefied gas is treated with a stream of odorized fluid cycled through said adsorbent bed until said bed is saturated with said odorant.

3. A method according to claim 2 wherein said odorized fluid is odorized liquefied petroleum gas.

4. A method for pretreating a bed of fresh adsorbent before said bed is placed into adsorption service to selectively adsorb contaminants from an odorized liquefied petroleum gas which comprises cycling a fluid stream of odorized material through said fresh bed of adsorbent until said bed of adsorbent is saturated with odorant, and then placing said bed into adsorption service.

5. A method according to claim 4 wherein said cycled material is odorized liquefied petroleum gas.

6. A method for removing contaminating materials from a liquefied petroleum gas containing same which comprises removing odorized liquefied petroleum gas containing said contaminants from a storage zone for said liquefied petroleum gas, passing said liquefied petroleum gas at ambient temperature to an adsorption zone containing at least two units wherein at least one unit is on adsorption cycle and at least one unit on regeneration cycle, each of said units containing a fixed bed of solid adsorbent that selectively removes said contaminants in the presence of liquefied petroleum gas, said bed of adsorbent in each of said units having been contacted with a cycled odorized stream until saturated with odorant before being placed into selective adsorption service, passing said contaminated liquefied petroleum gas in the liquid phase through one of said units in adsorption service to selectively remove said contaminants, passing decontaminated liquefied petroleum gas through a filter zone to remove entrained fines from said liquefied petroleum gas, and passing said filtered liquefied petroleum gas substantially free of contaminants and entrained adsorbent fines to a place of utilization.

7. A method according to claim 6 wherein said cycled odorized stream is odorized liquefied petroleum gas.

8. A method for removing contaminants from an odorized, liquefied petroleum gas which comprises removing a liquid stream of said liquefied petroleum gas containing said contaminants and an odorant from a storage zone, passing said stream under liquid phase conditions through an adsorption zone containing a fixed bed of a solid adsorbent that selectively adsorbs said contaminants in the presence of said liquefied petroleum gas, thereby obtaining a liquefied petroleum gas stream as a product substantially free of said contaminants, continuing said adsorption until said adsorbent has become spent, regenerating said adsorbent by desorbing said adsorbed contaminants therefrom, odorizing said regenerated adsorbent by cycling a stream of said odorized liquefied petroleum gas through said bed until said bed is saturated with odorant, and then placing said odorized bed of adsorbent back into selective adsorption service, thereby avoiding lowering of the odorant concentration of said liquefied petroleum gas passed to a place of utilization after adsorption of contaminants when a new or fresh bed of adsorbent is put into service.

9. A method according to claim 8 wherein said cycled stream of odorized liquefied petroleum gas is removed from said storage zone, passed through said bed of adsorbent and then returned to said storage zone.

References Cited in the file of this patent
UNITED STATES PATENTS

| | | |
|---|---|---|
| 2,250,925 | Babcock | July 29, 1941 |
| 2,530,300 | Hirschler | Nov. 14, 1950 |
| 2,727,367 | McKinney | Dec. 20, 1955 |
| 2,904,507 | Jahnig | Sept. 15, 1959 |
| 2,921,026 | Fleck et al. | Jan. 12, 1960 |